United States Patent
Radimirsch

(10) Patent No.: US 7,023,834 B1
(45) Date of Patent: Apr. 4, 2006

(54) DATA TRANSMISSION DEVICE

(75) Inventor: Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,710

(22) PCT Filed: Aug. 27, 1999

(86) PCT No.: PCT/DE99/02685

§ 371 (c)(1),
(2), (4) Date: Apr. 17, 2001

(87) PCT Pub. No.: WO00/24158

PCT Pub. Date: Apr. 27, 2000

(30) Foreign Application Priority Data

Oct. 16, 1998 (DE) ................................ 198 47 777

(51) Int. Cl.
*H04J 3/16* (2006.01)
*H04B 7/00* (2006.01)

(52) U.S. Cl. ...................... 370/349; 370/470; 370/522; 455/434; 455/515

(58) Field of Classification Search ................ 370/280, 370/294, 328, 345, 349, 420, 458, 463, 465, 370/470, 522; 455/422.1, 434, 450, 509, 455/515

See application file for complete search history.

(56) References Cited

U.S. PATENT DOCUMENTS 6,016,319 A * 1/2000 Kshirsagar et al. ......... 370/410
6,363,267 B1 * 3/2002 Lindskog et al. ........... 455/574
6,512,779 B1 * 1/2003 Vollmer et al. ............. 370/470
6,622,251 B1 * 9/2003 Lindskog et al. ........... 713/300
6,728,550 B1 * 4/2004 Bohnke et al. ............. 455/522

FOREIGN PATENT DOCUMENTS

DE 197 26 120 12/1998

OTHER PUBLICATIONS

Gibson, "The Mobile Communications Handbook", 1999, Springer Verlag, Heidelberg.
Bradner; Mankin, "The Recommendation for the IP Next Generation Protocol", Online, Jan. 1995, Retrieved from the Internet: <URL: http://hlapic.srce.hr/cgi-bin/rfc/rfc11752.txt>, Apr. 10, 2000, p. 22, lines 15-30.
A Kramling et al., "Performance Evaluation of MAC Schemes for Wireless ATM Systems with Centralized Control Considering Processing Delays," EPMCC, Bonn, 1997.
Karsten Brüninghaus, Markus Radimirsch, "Coarse Frame Synchronization for OFDM-Based Wireless Communication Systems", PIMRC, Boston, 1998.

* cited by examiner

*Primary Examiner*—Alpus H. Hsu
(74) *Attorney, Agent, or Firm*—Kenyon & Kenyon

(57) ABSTRACT

In a device for data transmission having a central station and a plurality of subscribers, in addition to useful signal data phases, signaling data phases are provided for the downlink and uplink in a transmission frame (3). The signaling data phases for the downlink are divided into signaling data phases related to the central station and related to the protocol. The positions of these two signaling data phases are identified directly or indirectly by identifiers.

15 Claims, 2 Drawing Sheets

DATA TRANSMISSION DEVICE

FIELD OF THE INVENTION

The present invention relates to a data transmission device on a common medium having a central station and a plurality of subscribers, which is controllable by transmitting data packets from the central station to the subscribers (downlink) and from the subscribers to the central station (uplink).

BACKGROUND INFORMATION

German Patent Application No. 197 26 120 describes a device where the central station assumes the coordinating function for media access via a protocol-oriented transmission frame referred to there as signaling periods. This transmission frame contains, in addition to the useful signal data phases, signaling data phases for the uplink and the downlink.

The method described in German Patent Application No. 197 26 120 includes the step that the position of the downlink signaling is announced in the previous downlink signaling. This method presents the problem that a subscriber (terminal) that wishes to log into the communication process has no previous information regarding the position of the downlink signaling (Broadcast Channel, BCH). Therefore, this terminal must demodulate the transmission channel until it has found a BCH and has demodulated the information about the position of the next BCH. Access to the transmission channel can therefore only take place in the following transmission frame.

SUMMARY

In accordance with an example embodiment of the present invention, faster access to the transmission channel is made possible. By dividing the downlink signaling data phase into signaling data phases related to the central station and related to the protocol, these two signaling data phases can be flexibly positioned at different points of the transmission frame. This allows the available transmission capacity to be fully utilized, in particular in the case where the DL-PDUs (Downlink Protocol Data Units) are composed of elements having different lengths. If the position of the BCH were constant, it might not be possible to fill the entire period between the start of the transmission frame and the protocol-related signaling data phase with useful data due to the flexible duration of the DL-PDUs. This would result in loss of transmission capacity.

DETAILED DESCRIPTION

Figure 1:
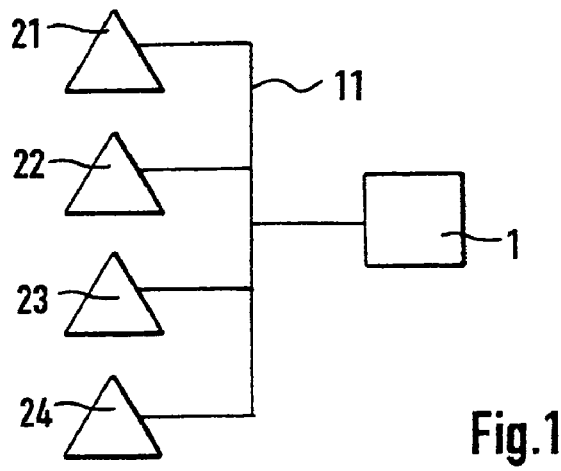
FIG. 1 shows a communication network having a central station and subscribers connected through a common medium.

FIG. 1 shows a communication network for a communication system. A central station 1 communicates via a common transmission medium 11 having subscribers 21, 22, 23, etc. in the form of terminals, central station 1 being responsible for the coordinating function for media access (Medium Access Control, MAC) to the jointly utilized medium. Central station 1 may be connected to a higher-level network, so that terminals can connect to one another and to other subscribers in the network. It is, however, also possible that the central station 1 is not connected to a network, so that the terminals can only communicate with central station 1 and with one another. In this case, the traffic always goes through central station 1 or the direct exchange between terminals must be coordinated by central station 1. A jointly utilized transmission medium 11 is a wireless channel, for example, but can also be a PON (Passive Optical Network) or an HFC (Hybrid Fiber Coax) network.

Figure 2:
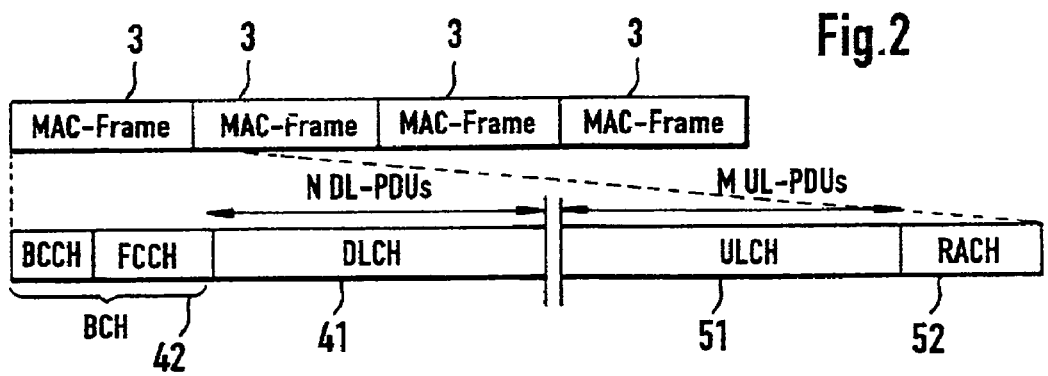
FIG. 2 shows the basic structure of a transmission frame according to an example embodiment of the present invention.

FIG. 2 shows the structure of a transmission frame for the communication network illustrated in FIG. 1. Transmission frames 3 are labeled here as MAC frames, contrary to German Patent Application No. 197 26 120 or A. Krämling et al. "Performance Evaluation of MAC Schemes for Wireless ATM Systems with Centralised Control Considering Processing Delays" EPMCC, Bonn, 1997, where they are labeled as signaling periods. At the beginning of a transmission frame 3, downlink signaling data phase 42—BCH (Broadcast Channel)—appears. It is followed by useful signal data phase 41 for the downlink. It is labeled as DLCH (Downlink Channel) and includes N useful data time slots for the DL-PDUs (Downlink Protocol Data Units). Similarly, M useful data time slots are provided for the UL-PDUs (Uplink Protocol Data Units) for useful signal data phase 51 of the uplink ULCH (Uplink Channel). Uplink signaling data phase 52 is labeled as RACH (Random Access Channel).

Download signaling data phase BCH is divided into two categories as shown in FIG. 2: a signaling data phase 421 related to the central station—BCCH (Broadcast Control Channel)—and a protocol-related signaling data phase 422—FCCH (Frame Control Channel). In BCCH 421, central station 1 can forward information to the terminals that is of global relevance for central station 1 and the communication with the connected terminals. This includes information such as capabilities of the central station, manufacturer information, current operating modes, and address of the central station. On the other hand, FCCH 422 determines the structure and the contents of the remaining transmission frame 3 (MAC frame). Thus, FCCH has primarily local, MAC frame-related importance. In FIG. 2, which only shows the principle of the frame structure, BCCH and FCCH are shown directly following one another without taking into consideration the frame structure according to the present invention which is explained below.

Initially we shall assume that the position of the BCCH which contains the global information is always located at the beginning of MAC frame 3. In this case, it is advantageous if the position of FCCH 422 is announced in BCCH 421. Furthermore, it can be advantageous if a special identifier is transmitted immediately before the occurrence of FCCH 422 in addition to the identifier at the beginning of MAC frame 3 (see, German Patent Application No. 197 26

120 and Karsten Brüninghaus, Markus Radimirsch, "Coarse Frame Synchronisation for OFDM-Based Wireless Communication Systems," PIMRC, Boston, 1998). It is advantageous if this identifier is different from the identifier at the beginning of MAC frame 3; however, in principle, it may also be identical to it.

Figure 3:
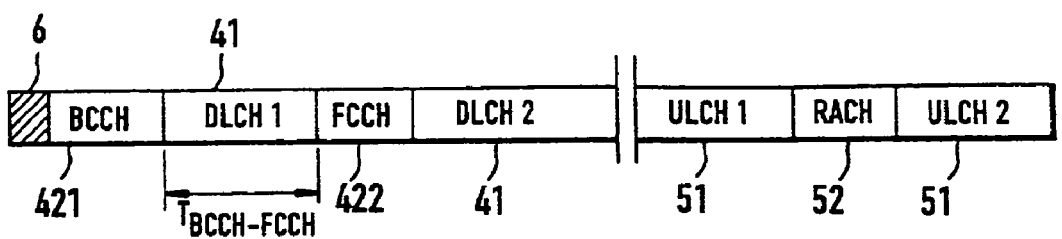
FIG. 3 shows an example of a transmission frame according to the present invention.

An exemplary MAC frame 3 for a device according to the present invention is illustrated in FIG. 3. MAC frame 3 begins with an identifier 6, which unambiguously indicates that this is the beginning of the MAC frame. An example of such an identifier is described, for example, in German Patent Application No. 197 26 120. It is followed by signaling data phase 421—BCCH—which contains, among other things, the time interval (indirect identifier) between BCCH and FCCH-T index (BCCH-FCCH). This information is evaluated by terminals 21, 22, 23, etc., so that FCCH can be demodulated in a controlled manner as needed.

For this purpose, reference points in time are established; these are the end of the BCCH and the beginning of the FCCH in the example according to FIG. 3. The time reference of the BCCH may also be located at the beginning or at a point in time in the middle of the BCCH or it may be the identifier itself. The reference point in time of the FCCH could also be at the beginning or at some point in the middle of the FCCH. A terminal may also receive this time interval T index (BCCH-FCCH) as a fixed value from the manufacturer. This interval can also be determined on the basis of manufacturer-specific considerations or from a standard.

Another option is a flexible interval T index (BCCH-FCCH), which is calculated by central station 1 as a function of the requirements of each situation and communicated to the terminals. The current interval can be transmitted to the terminals in the BCCH. This allows the entire DLCH 41 (Downlink Useful Data Signal Phase 41) to be filled if the length of the DL-PDUs is not constant, as explained previously, but is composed of elements having different durations.

The granularity of this time interval can be measured in system cycles; in general, the system clock is specified in a standard. Another option is the explicit specification of a time granularity which may be the duration of the smallest unit from which a DL-PDU can be composed, for example. This time granularity is a common divisor of the durations of all possible DL-PDUs. The function of the FCCH is described in detail in German Patent Application No. 197 26 120 and A. Krämling et al. "Performance Evaluation of MAC Schemes for Wireless ATM Systems with Centralised Control Considering Processing Delays" EPMCC, Bonn, 1997; it assigns time slots to the terminals for reception and transmission. Both the chronological sequence of the individual elements of a MAC frame 3 and the effects of the FCCH are specified there. A terminal that wishes to log onto the network can calculate the position in time of the remaining elements of MAC frame 3 and, of course, also of the RACH from the information of the FCCH and, using this information, begin communicating with the central station.

Additional possible embodiments of the present invention are presented below:

BCCH 421 is not located directly at the beginning of MAC frame 3, but has a constant distance from the beginning of the MAC frame.

Figure 4:
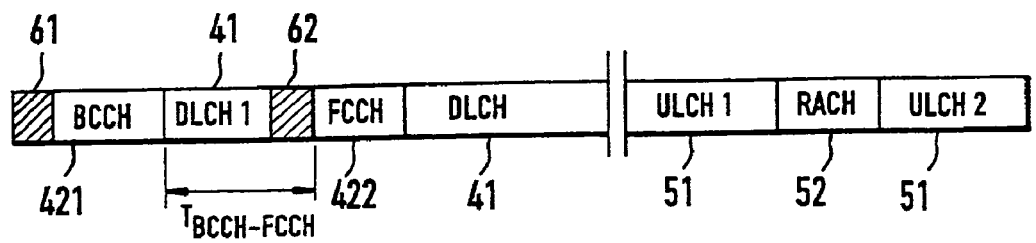
FIG. 4 shows a transmission frame having identifiers before the protocol-related and the central station-related signaling data phases.
Figure 5:
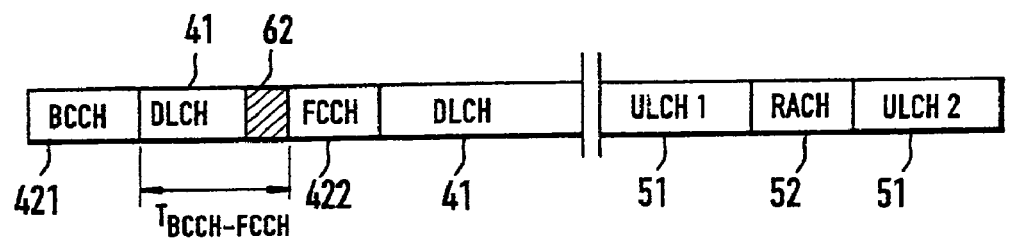
FIG. 5 shows a transmission frame having a direct identifier only before the protocol-related signaling data phase.

It is also possible to identify the position of FCCH 422 through an additional identifier. In this case, the following combinations are possible:

an additional identifier 62 is transmitted before FCCH 422; this identifier can be advantageously distinguished in the receiver from identifier 61 located before BCCH 421. It is also possible that FCCH 422 is announced in BCCH 421 or that BCCH 421 announces the position of FCCH 422. This is illustrated in FIG. 4.

no identifier is inserted before BCCH 421, so the identifier 62 before FCCH 422 is unique and it unambiguously identifies the position of FCCH 422. Also in this case, FCCH 422 may or may not be announced in BCCH 421. This is illustrated in FIG. 5.

Figure 6:
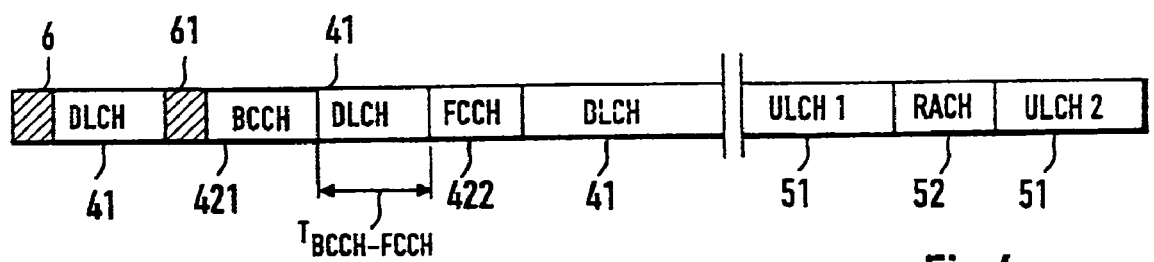
FIG. 6 shows a transmission frame having an identifier immediately before the signaling data phase related to the central station.

If the position of BCCH 421 is not located at the beginning of MAC frame 3, which is provided with identifier 6 as a frame identifier, it may be advantageous to transmit an easy-to-detect additional identifier 61 immediately before BCCH 421. This is illustrated in FIG. 6. Here too, an additional identifier may be inserted before FCCH 422; identifier 61 may be present before BCCH 421 or it may be omitted.

What is claimed is:

1. A method for transmitting data on a common medium in a system including a central station and a plurality of subscribers, data packets in the system being transmitted from the central station to the subscribers (downlink) and from the subscribers to the central station (uplink), the central station being responsible for coordinating media access via a protocol-oriented transmission frame, the transmission frame including a useful signal data phase and a signaling data phase for the uplink and the downlink, the method comprising:
dividing the signaling data phase for the downlink into a signaling data phase related to the central station and a protocol-related signaling data phase;
providing at least one identifier of a position in time of the protocol-related signaling data phase of the downlink in the transmission frame; and
including the at least one identifier directly in the signaling data phase for the downlink.

2. The method according to claim 1, further comprising:
announcing the position of the protocol-related signaling data phase, the position being announced in an announcement in the signaling data phase related to the central station, the announcement for indirectly identifying the protocol-related signaling data phase.

3. The method according to claim 1, wherein the announcement contains a time interval of the protocol-related signaling data phase.

4. The method according to claim 1, further comprising:
providing a subscriber-related signaling data phase at a beginning of the transmission frame.

5. The method according to claim 1, further comprising:
providing a first one of the at least one identifier immediately before the signaling data phase related to the central station, the first one of the at least one identifier for identifying a beginning of the transmission frame.

6. The method according to claim 1, wherein a time interval between the signaling data phase related to the central station and the protocol-related signaling data phase is a fixed value.

7. The method according to claim 1, further comprising:
communicating to the subscribers via the central station a time interval between the signaling data phase related to the central station and the protocol-related data signaling data phase, the time interval between the signaling data phase related to the central station and the protocol-related signaling data phase being variable.

8. The method according to claim 1, wherein a time interval between the signaling data phase related to the central station and the protocol-related signaling data phase is filled with useful data.

9. The method according to claim 1, wherein the signaling data phase related to the central station is at a constant distance from a beginning of the transmission frame.

10. The method according to claim 1, further comprising:
providing reference points in time for the signaling data phase related to the central station and the protocol-related signaling data phase, the reference points in time being located one of: i) in a beginning of a respective signaling data phase, ii) in a middle of a respective signaling data phase, and iii) in at least one of the at least one identifier.

11. The method according to claim 10, further comprising:
providing a first one of the at least one identifier before the signaling data phase related to the central station and a second one of the at least one identifier before the protocol-related signaling data phase, the first one of the identifier and the second one of the at least one identifier being different from one another.

12. The method according to claim 11, wherein the first one of the identifier and the second one of the identifier being different from one another regardless of whether a position of the protocol-related signaling data phase is announced in the signaling data phase related to the central station.

13. The method according to claim 1, further comprising:
providing the at least one identifier only before the protocol-related signaling data phase regardless of whether a position of the protocol-related signal data phase is announced in the signaling data phase related to the central station.

14. The method according to claim 1, further comprising:
providing an additional identifier of the transmission frame independently of the at least one identifier.

15. A method for transmitting data on a common medium in a system including a central station and a plurality of subscribers, data packets in the system being transmitted from the central station to the subscribers (downlink) and from the subscribers to the central station (uplink), the central station being responsible for coordinating media access via a protocol-oriented transmission frame, the transmission frame including a useful signal data phase and a signaling data phase for the uplink and the downlink, the method comprising:
dividing the signaling data phase for the downlink into a signaling data phase related to the central station and a protocol-related signaling data phase;
providing a first identifier of a position in time of the protocol-related signaling data phase of the downlink in the transmission frame; and
deriving the first identifier of the position in time of the protocol-related signaling data phase of the downlink from a second identifier, the second identifier being provided for a position of the signal data phase related to the central station.

\* \* \* \* \*